United States Patent

Tao et al.

[11] 3,898,064
[45] Aug. 5, 1975

[54] APPARATUS FOR FILTERING ENGINE EXHAUST

[75] Inventors: Ting C. Tao; Robert W. Heiser, both of Brooklyn Heights, Ohio

[73] Assignee: Rockwell International Corporation, Pittsburgh, Pa.

[22] Filed: May 9, 1974

[21] Appl. No.: 468,319

[52] U.S. Cl. ............... 55/276; 55/337; 55/426; 55/429; 55/448; 55/DIG. 21; 55/DIG. 30; 60/311
[51] Int. Cl.² .................................. B01D 50/00
[58] Field of Search ............ 55/276, 321, 322, 325, 55/329, 330, 337, 429, 399, 448, 497, 503, 55/522, DIG. 16, DIG. 20, DIG. 21, 55/DIG. 30, 425, 426; 60/311

[56] References Cited
UNITED STATES PATENTS

| | | | |
|---|---|---|---|
| 1,864,201 | 6/1932 | Kegerreis et al. | 55/429 |
| 2,096,000 | 10/1937 | Miles | 55/DIG. 21 |
| 2,216,763 | 10/1940 | Boyce | 55/276 |
| 2,732,026 | 1/1956 | Folts | 55/503 |
| 3,078,650 | 2/1963 | Anderson et al. | 55/337 |
| 3,286,787 | 11/1966 | Wirt | 55/DIG. 21 |
| 3,307,336 | 3/1967 | Dewsberry | 55/337 |
| 3,374,857 | 3/1968 | Hutchins | 55/276 |
| 3,382,651 | 5/1968 | Hahl et al. | 55/426 X |
| 3,434,268 | 3/1969 | McKenzie | 55/DIG. 30 |
| 3,712,029 | 1/1973 | Chartow | 55/276 X |
| 3,757,892 | 9/1973 | Raudman, Jr. | 55/276 |

*Primary Examiner*—Frank W. Lutter
*Assistant Examiner*—David L. Lacey

[57] ABSTRACT

A filter apparatus in the exhaust system of an internal combustion engine removes impurities from the exhaust gases. The exhaust gases are directed within the filter container to swirl around the interior circumference of the container so that centrifugal force will cause a relatively large amount of the impurities to be trapped in a region of the container out of the general flow path of the gases. The gases then flow through a fiberglass filter toward a central region of the container which communicates with an outlet fitting. The filter removes substantially all of the remaining impurities prior to the gases being exhausted to atmosphere.

3 Claims, 6 Drawing Figures

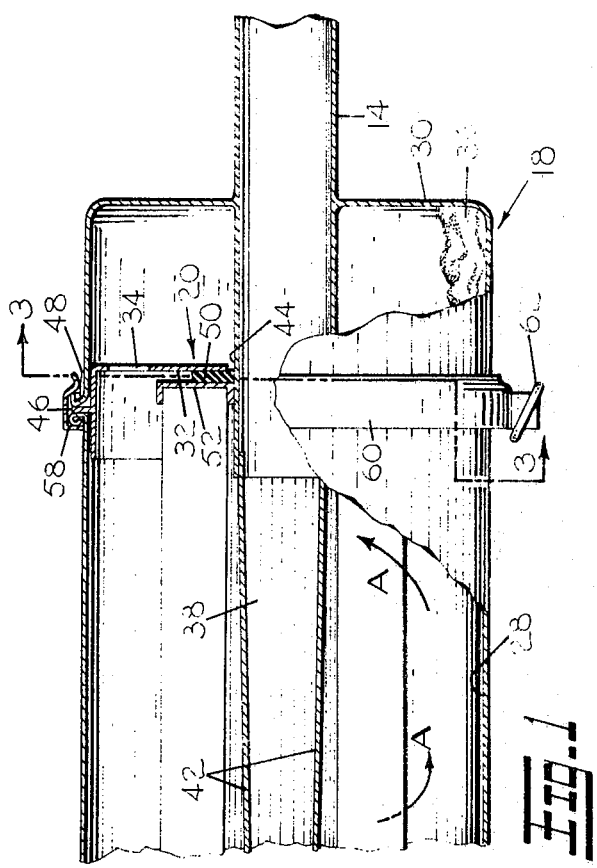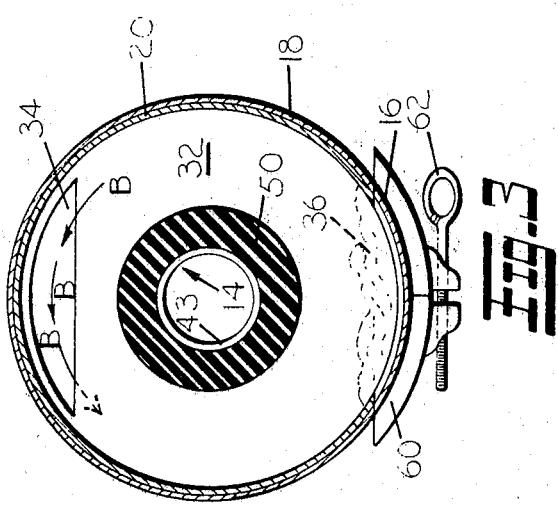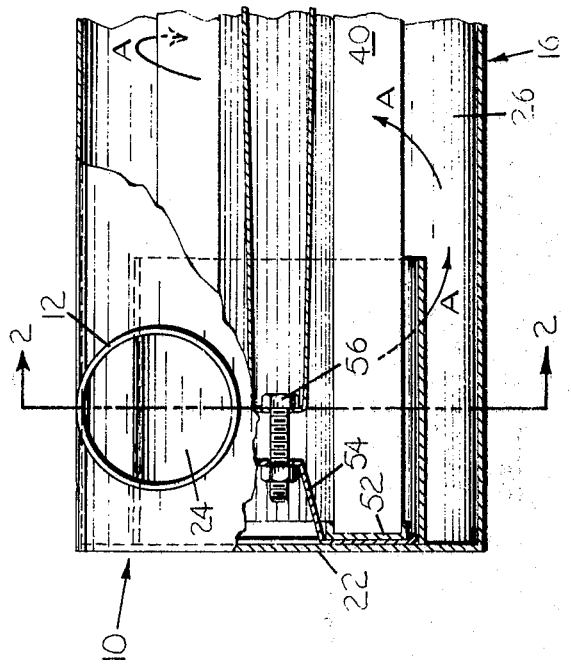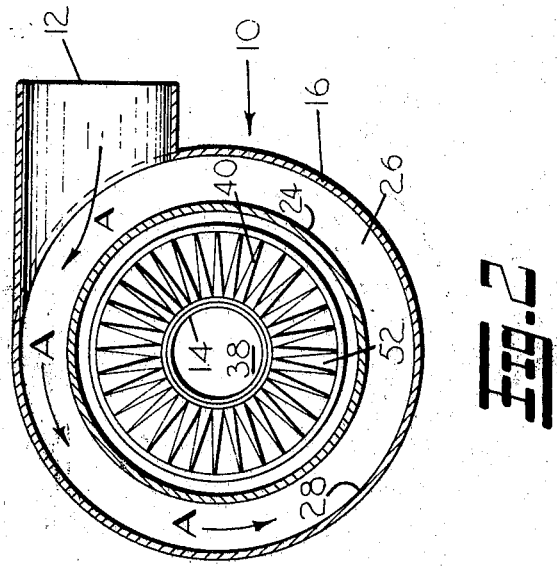

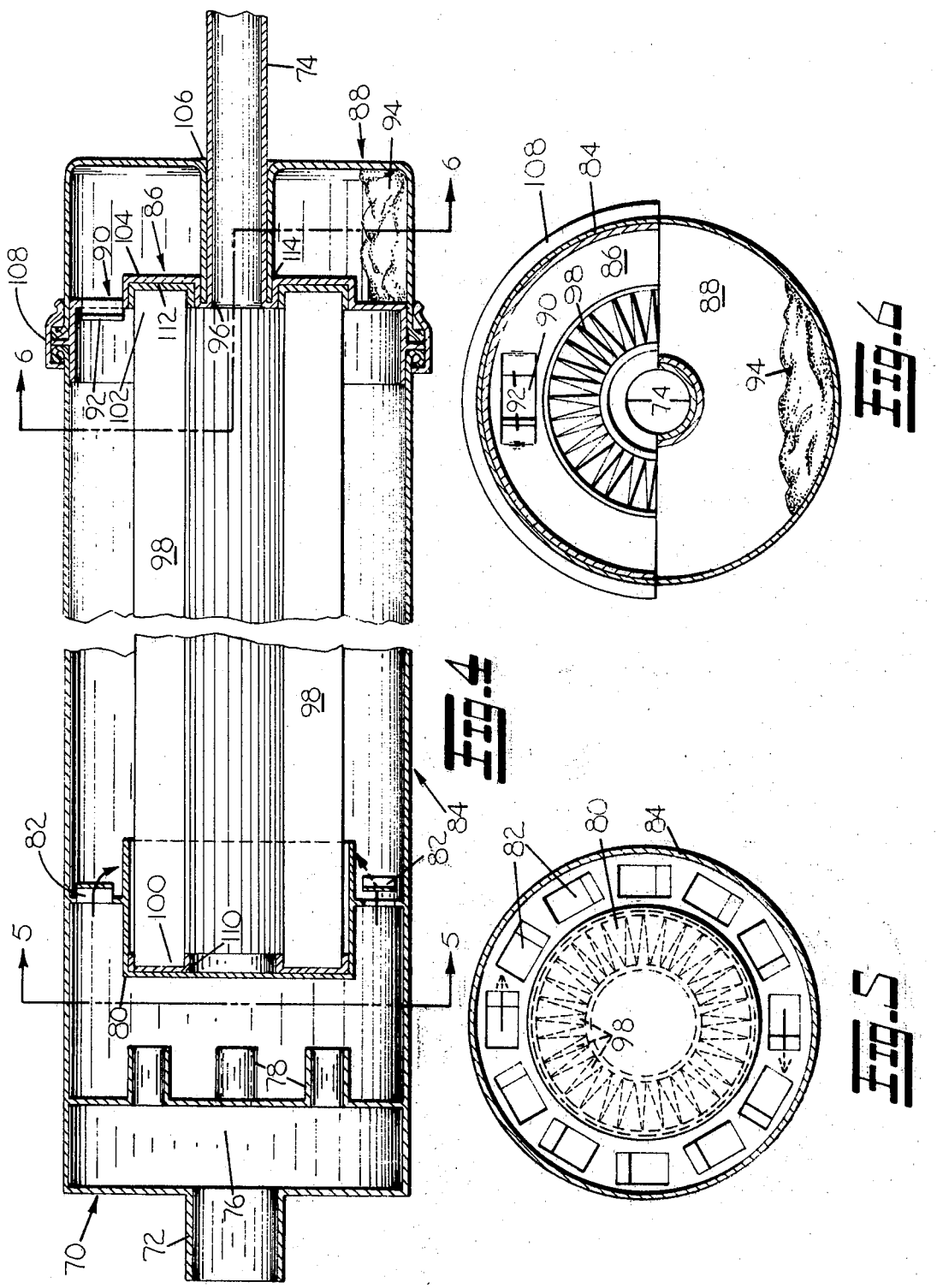

APPARATUS FOR FILTERING ENGINE EXHAUST

BACKGROUND OF THE INVENTION

1. Field of the Invention.

This invention relates to a filter apparatus and, more specifically, to a filter apparatus for removing impurities from the exhaust gases of an internal combustion engine.

2. Description of the Prior Art.

With the recent concern regarding the amount of pollution in the atmosphere, efforts have been made to reduce the contribution of the automobile to this problem. Although some emission control devices have been directed more to the chemical nature of the automobile exhaust gases, serious consideration has been given to the solid and liquid impurities suspended in the exhaust gases in the form of small particles or droplets.

The general task of removing these impurities is complicated by high temperatures and large volumes of gas which are experienced in an exhaust system. Even though filter material capable of operating reliably at higher temperatures does exist, the amount of impurities contained in the exhaust gases has been found to limit its effective life. A large build-up of impurities on the filter material can greatly increase the exhaust backpressure and interfere with the internal combustion process. Periodic cleaning or changing of the filter material can be both time consuming and expensive and can greatly complicate exhaust maintenance of the automobile.

SUMMARY OF THE INVENTION

It is therefore an object of the present invention to provide a filter apparatus for the exhaust system of an internal combustion engine capable of reliable operation at high temperatures.

It is a further object to provide a filter apparatus of the type described in which the filter material will have a long effective life to minimize and simplify any maintenance that may be required.

To accomplish these and other objects of the invention, a preferred embodiment thereof includes an elongated, gastight container having an inlet fitting at a first end through which engine exhaust gases having impurities enter the container and an outlet fitting at its second end. The exhaust gases entering the inlet fitting are swirled through a circumferential region of the container. The container includes a means for collecting a substantial portion of the impurities separated from the exhaust gases by centrifugal force during the swirling. A central region of the container communicates with the outlet fitting for discharging exhaust gases from the container. A heat-resistant, fiberous filter element encircles the central region so that exhaust gases pass from the circumferential region through the filter element to the central region to cause the filter element to remove the remaining impurities from the exhaust gases.

BRIEF DESCRIPTION OF THE DRAWINGS

FIG. 1 is a sectional side view of a preferred filter apparatus.

FIG. 2 is a view as seen along line 2—2 of FIG. 1.

FIG. 3 is a view as seen along line 3—3 of FIG. 1.

FIG. 4 is a sectional side view of an alternative filter apparatus.

FIG. 5 is a view as seen along line 5—5 of FIG. 4.

FIG. 6 is a view as seen along line 6—6 of FIG. 4.

DETAILED DESCRIPTION OF THE PREFERRED EMBODIMENTS

As seen in FIGS. 1, 2 and 3, a preferred filter apparatus has a length of about 22 inches and a diameter of about 6.5 inches and includes an elongated container 10 having an inlet fitting 12 connected by exhausting piping to the muffler or engine exhaust and an outlet fitting 14 connected to the tailpipe. Structurally, the container primarily includes a filter section 16 and a trap section 18 with a dividing plate 20 therebetween.

The exhaust gases having undesirable impurities suspended therein enter the container 10 through the inlet fitting 12. The inlet fitting 12 is located at the forward end 22 of the filter section 16 and is tangentially disposed to the cylindrical filter section 16. As the exhaust gases enter the filter section 16, they strike a cylindrical baffle plate 24 to cause them to swirl about a circumferential region 26 as indicated by the arrows A. The centrifugal force on the impurities tends to cause them to gather at the inside surface 28 of the filter section 16. Since the only escape for the gases is at the rearward end 30 of the container 10 through the outlet 14, there is also a tendency to move rearwardly.

When the impurities reach the dividing plate 20, they continue to move in a circular path, as indicated by the arrows B in FIG. 3, along the surface 32 of the dividing plate 20. An opening 34 in the upper portion of the dividing plate 20 allows the impurities to pass from the filter section 16 into the trap section 18. Since the opening 34 is the only access to the trap section 18, the impurities tend to collect at the base 36 and are consequently removed from the exhaust gases.

However, although effectively removing a substantial portion of the impurities, this centrifugal trapping still leaves some impurities suspended in the exhaust gases. The exhaust gases, not being able to escape from the circumferential region 26 by way of the trap section 18, are forced toward the outlet fitting 14. The outlet fitting 14 communicates with a central region 38 which, as a result, is open to the atmosphere. The exhaust gases, therefore, tend to pass from the circumferential region 26 to the central section 38. A filter element 40 encircles the central section 38 so that all of the gases must pass therethrough. The filter element 40 is preferably made of a pleated fiberglass material able to withstand the high temperatures of the exhaust system and to remove substantially all of the remaining impurities from the exhaust gases.

For a further understanding of the preferred filter apparatus, a detailed description of the container 10 is essential in addition to the operational explanation hereinabove. The container 10 includes the filter section 16, trap section 18 and dividing plate 20 which are separable members. The inlet fitting 12 and baffle plate 24 are integral parts of the filter section 16. The outlet fitting 14 extends through the trap section 18 and is integral therewith. A filter support frame 42 formed of metal strip to be generally U-shaped extends from the outlet fitting 14 into the central region 38.

To assemble the container 10, the filter support frame 42 and the forward portion 43 of the outlet fitting 14 are inserted into a central opening 44 in the dividing plate 20. The dividing plate 20 includes a peripheral rim 46 which makes contact with a curled rim 48 of the trap section 18. A resilient, heat-resistant sealing ring 50 is installed to closely encircle the forward portion 43 of the outlet fitting 14.

The filter element 40, including end plates 52 for support, is also positioned over the support frame 42 and the forward portion 43. A filter retaining clamp 54, which is secured to the support frame 42 by a nut and bolt 56, forces the filter element 40 against the sealing ring 50. It can be seen that the sealing ring 50 insures the trap section 18 is sealed at the opening 44 from both the circumferential region 26 and the central region 38.

The assembly is completed by joining the rims 46 and 48 with the curled rim 58 of the filter section 16. A locking ring 60 holds the sections together when the adjusting screw 62 is tightened. The tightening of the locking ring 60 insures that the container 10 is gastight and that the edges of the filter section 16 and trap section 18 are sealed. Further, with the forward end of the filter element 40 positioned against the inner wall of the filter section 16 and the rearward end of the filter element 40 against the sealing ring 50, the circumferential region 26 and the central region 38 are completely separated by the filter element 40 so that all of the exhaust gases must flow therethrough.

An alternative filter apparatus shown in FIGS. 4, 5 and 6 includes an exhaust gas flow path similar to that of container 10. A filter container 70 also includes an inlet fitting 72 and an outlet fitting 74. However, the inlet fitting 72 is axially aligned with the container 70. Exhaust gases enter the inlet fitting 72 into a muffler region 76 where they flow through silencing tubes 78. As the gases continue to flow rearwardly, a cylindrical baffle plate 80 causes the gases to flow outwardly toward the inner wall of container 70 and through an array of vanes 82. The vanes 82 cause the exhaust gases to swirl within a filter section 84 of the container 70 in a manner like that obtained in container 10.

Also like container 10, the container 70 includes a dividing plate 86 and a trap section 88. An opening 90 in the dividing plate 86 is generally rectangular in shape and includes deflecting edges 92 to help guide the impurities into the trap section 88 to be there collected at the bottom 94.

The container 70 is structurally different from the container 10 to indicate how an alternative configuration can be utilized to accomplish the same filtering features. The inlet fitting 72, silencing tubes 78, baffle plate 80, and vanes 82 are integral portions of the filter section 84. Unlike container 10, the outlet fitting 74 is integrally secured to the dividing plate 86 at a central opening 96.

During assembly, a filter element 98 is positioned with its forward end 100 within the cylindrical baffle plate 80. The rearward end 102 of the filter element 98 is located for proper alignment of the element 98 in a circular depression 104 in the dividing plate 86 as it is positioned against the filter section 84. Aligning an opening 106 in the trap section 88 with the rearward portion of the outlet fitting 74 allows the trap section 88 to encircle the outlet fitting 74 as it is moved forwardly against the dividing plate 86. A locking strap 108 is again installed to secure the sections in position and to seal the container 70. Although not shown in the drawings, sealing rings such as ring 50 might be utilized at 110, 112 and 114 to further insure the desired flows and sealing are provided.

From the embodiments disclosed hereinabove, it should be apparent that the centrifugal trapping of impurities will appreciably increase the effective life of the filter elements. However, should the trap section become full of impurities, it could be emptied without requiring the filter element to be replaced. Generally, providing the container with separable sections allows easy access to the filter element or the trap section. In container 10, removing the hanging strap from the tailpipe frees the container 10 for separation and, in the container 70, the trap section can be emptied by simply loosening the locking strap and sliding the trap section rearwardly along the outlet fitting.

It is felt that the invention and many of its attendant advantages will be understood from the foregoing description and it will be apparent that various changes may be made in the form, construction and arrangement of the embodiments of the filter assemblies described without departing from the spirit and scope of the invention or sacrificing all of its material advantages, the forms hereinabove described being merely preferred embodiments thereof.

I claim:

1. A filter container capable of removing impurities from exhaust gases of an internal combustion engine flowing therethrough, said container comprising:

a generally cylindrical filter section having a closed forward end and an opened rearward end, said filter section having an inlet fitting mounted on the cylindrical wall of said filter section at said closed forward end and tangentially disposed thereto to initially direct said gases entering said inlet fitting between said cylindrical wall and a cylindrical baffle plate coaxially aligned with said closed forward end to cause said gases to swirl around the inner surface of said cylindrical wall of said filter section, a generally cylindrical trap section having an outer edge of an opened forward end alignable with the edge of said wall of said filter section at said opened rearward end, a dividing plate having an outer periphery disposable between said filter section and said trap section, means for removably securing said trap section to said filter section at their respective said edges with said outer periphery of said dividing plate disposed therebetween, said means for securing at said edges producing a gastight sealing for said container, a filter tube of pleated fiberglass material coaxially disposed within said filter section inwardly of said baffle plate to extend between the said closed forward end of said filter section and said dividing plate and to separate an axially-aligned central region of said filter section and a circumferential region of said filter section, said dividing plate having at least one opening therein aligned with the upper portion of said circumferential region to provide the only communication between said filter section and the interior of said trap section, and an outlet fitting integral with said trap section and coaxially extending therethrough, said outlet fitting having a forward portion which is received within a sealed central opening in said dividing plate to communicate with said central region of said filter section to allow said exhaust gases to flow from said container, whereby said exhaust gases will generally flow rearwardly through said container, said impurities will be removed from said exhaust gases by collection in said trap section and on said filter tube, and said means for removably securing said trap section to said filter section facilitates replacement of said filter tube and removal of said impurities from said trap section for continued use of said container.

2. A filter container capable of removing impurities from exhaust gases of an internal combustion engine flowing therethrough, said container comprising:
- a generally cylindrical filter section having a closed forward end including a coaxially aligned inlet fitting extending therethrough and an opened rearward end, said filter section having a forward portion and a rearward portion separated by a centrally located baffle plate and encircling array of vanes for baffling gases entering said inlet fitting to cause them to swirl around the inner surface of the cylindrical wall of said rearward portion of said filter section,
- a generally cylindrical trap section having an outer edge of an opened forward end alignable with the edge of said wall of said filter section at said opened rearward end, said trap section having a coaxially aligned, integral tubular portion extending forwardly from a rear wall to define an opening therethrough,
- a dividing plate having an outer periphery disposable between said filter section and said trap section,
- means for removably securing said trap section to said filter section at their respective said edges with said outer periphery of said dividing plate disposed therebetween, said means for securing at said edges producing a gastight sealing for said container,
- a filter tube of pleated fiberglass material coaxially disposed within said rearward portion of said filter section to extend between the said baffle plate of said filter section and said dividing plate and to separate an axially-aligned central region of said filter section and a circumferential region of said filter section,
- said dividing plate having at least one opening therein aligned with the upper portion of said circumferential region to provide the only communication between said filter section and the interior of said trap section, and
- an outlet fitting integrally formed in said dividing plate to communicate with said central region and to extend from said dividing plate snugly through said tubular portion of said trap section to allow said exhaust gases to flow from said container, whereby said exhaust gases will generally flow rearwardly through said container, said impurities will be removed from said exhaust gases by collection in said trap section and on said filter tube, and said means for removably securing said trap section to said filter section facilitates replacement of said filter tube and removal of said impurities from said trap section for continued use of said container.

3. A filter container as set forth in claim 2, further including means for muffling said exhausted gases disposed within said forward portion of said filter section.

* * * * *